United States Patent
Morris et al.

(10) Patent No.: US 9,541,113 B2
(45) Date of Patent: Jan. 10, 2017

(54) ELASTICALLY AVERAGED ALIGNMENT SYSTEMS AND METHODS

(71) Applicant: GM GLOBAL TECHNOLOGY OPERATIONS LLC, Detroit, MI (US)

(72) Inventors: Steven E. Morris, Fair Haven, MI (US); Jennifer P. Lawall, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 354 days.

(21) Appl. No.: 14/151,279

(22) Filed: Jan. 9, 2014

(65) Prior Publication Data

US 2015/0194650 A1    Jul. 9, 2015

(51) Int. Cl.
*B25G 3/00* (2006.01)
*F16D 1/00* (2006.01)
(Continued)

(52) U.S. Cl.
CPC ............ *F16B 19/02* (2013.01); *F16B 5/07* (2013.01); *Y10T 29/49895* (2015.01); *Y10T 403/1616* (2015.01)

(58) Field of Classification Search
CPC ............. Y10T 403/1616; Y10T 403/1624; Y10T 403/4642; Y10T 403/4657; Y10T 403/471; Y10T 403/54; Y10T 403/7037; Y10T 403/7039; Y10T 29/49895; F16B 5/07; F16B 5/025; F16B 19/02; F16B 21/086; H01M 2/1083; B62D 27/04; B62D 65/024
(Continued)

(56) References Cited

U.S. PATENT DOCUMENTS 1,219,398 A    3/1917    Huntsman
1,261,036 A    4/1918    Kerns
(Continued)

FOREIGN PATENT DOCUMENTS

BE    842302 A    9/1976
CN    1032581 A    4/1989
(Continued)

OTHER PUBLICATIONS

"Elastic Averaging in Flexture Mechanisms: A Multi-Beam Paralleaogram Flexture Case-Study" by Shorya Awtar and EDIP Sevincer, Proceedings of IDETC/CIE 2006, Paper DETC2006-99752, American Society of Mechanical Engineers (ASME), Sep. 2006.
(Continued)

*Primary Examiner* — Gregory Binda
*Assistant Examiner* — Nahid Amiri
(74) *Attorney, Agent, or Firm* — Cantor Colburn LLP (57) ABSTRACT

In one aspect, a component for an elastically averaged alignment system is provided. The component includes a body, an inner wall formed in the body and defining an alignment aperture, and an alignment member. The alignment member includes a pair of tabs extending from the body, and the alignment member is an elastically deformable material such that when the alignment member is inserted into another alignment aperture of another component, the alignment member elastically deforms to an elastically averaged configuration to facilitate aligning the component relative to the another component of the elastically averaged alignment system. The alignment aperture is configured to receive another alignment member of another component of the elastically averaged alignment system.

7 Claims, 3 Drawing Sheets

(51) Int. Cl.
  *F16D 1/09* (2006.01)
  *F16B 19/02* (2006.01)
  *F16B 5/07* (2006.01)

(58) Field of Classification Search
  USPC ... 403/13, 14, 245, 250, 266, 291, 360, 361; 411/508
  See application file for complete search history.

(56) References Cited

U.S. PATENT DOCUMENTS

| | | |
|---|---|---|
| 1,301,302 A | 4/1919 | Nolan |
| 1,556,233 A | 10/1925 | Maise |
| 1,819,126 A | 8/1931 | Scheibe |
| 1,929,848 A | 10/1933 | Neely |
| 1,968,168 A | 7/1934 | Place |
| 1,982,076 A | 11/1934 | Spahn |
| 1,999,990 A | 4/1935 | Carr |
| 2,006,525 A | 7/1935 | Thal |
| 2,267,558 A | 12/1941 | Birger, et al. |
| 2,275,103 A | 3/1942 | Gooch, et al. |
| 2,275,900 A | 3/1942 | Hall |
| 2,385,180 A | 9/1945 | Allen |
| 2,482,488 A | 9/1949 | Franc |
| 2,560,530 A | 7/1951 | Burdick |
| 2,612,139 A | 9/1952 | Collins |
| 2,688,894 A | 9/1954 | Modrey |
| 2,693,014 A | 11/1954 | Monahan |
| 2,707,607 A | 5/1955 | O'Connor |
| 2,778,399 A | 1/1957 | Mroz |
| 2,780,128 A | 2/1957 | Rapata |
| 2,788,046 A | 4/1957 | Joseph |
| 2,862,040 A | 11/1958 | Curran |
| 2,902,902 A | 9/1959 | Slone |
| 2,940,149 A | 6/1960 | O'Connor |
| 2,946,612 A | 7/1960 | Ahlgren |
| 2,958,230 A | 11/1960 | Haroldson |
| 3,005,282 A | 10/1961 | Christiansen |
| 3,014,563 A | 12/1961 | Bratton |
| 3,087,352 A | 4/1963 | Daniel |
| 3,089,269 A | 5/1963 | McKiernan |
| 3,130,512 A | 4/1964 | Van Buren, Jr. |
| 3,152,376 A | 10/1964 | Boser |
| 3,168,961 A | 2/1965 | Yates |
| 3,169,004 A | 2/1965 | Rapata |
| 3,169,439 A | 2/1965 | Rapata |
| 3,188,731 A | 6/1965 | Sweeney |
| 3,194,292 A | 7/1965 | Borowsky |
| 3,213,189 A | 10/1965 | Mitchell et al. |
| 3,230,592 A | 1/1966 | Hosea |
| 3,233,358 A | 2/1966 | Dehm |
| 3,233,503 A | 2/1966 | Birger |
| 3,244,057 A | 4/1966 | Mathison |
| 3,248,995 A | 5/1966 | Meyer |
| 3,291,495 A | 12/1966 | Liebig |
| 3,310,929 A | 3/1967 | Garvey |
| 3,413,752 A | 12/1968 | Perry |
| 3,473,283 A | 10/1969 | Meyer |
| 3,531,850 A | 10/1970 | Durand |
| 3,551,963 A | 1/1971 | Long |
| 3,643,968 A | 2/1972 | Horvath |
| 3,669,484 A | 6/1972 | Bernitz |
| 3,680,272 A | 8/1972 | Meyer |
| 3,733,655 A | 5/1973 | Kolibar |
| 3,800,369 A | 4/1974 | Nikolits |
| 3,841,044 A | 10/1974 | Brown |
| 3,841,682 A | 10/1974 | Church |
| 3,842,565 A | 10/1974 | Brown et al. |
| 3,845,961 A | 11/1974 | Byrd, III |
| 3,847,492 A | 11/1974 | Kennicutt et al. |
| 3,860,209 A | 1/1975 | Strecker |
| 3,868,804 A | 3/1975 | Tantlinger |
| 3,895,408 A | 7/1975 | Leingang |
| 3,897,967 A | 8/1975 | Barenyl |
| 3,905,570 A | 9/1975 | Nieuwveld |
| 3,972,550 A | 8/1976 | Boughton |
| 3,988,808 A | 11/1976 | Poe et al. |
| 4,035,874 A | 7/1977 | Liljendahl |
| 4,039,215 A | 8/1977 | Minhinnick |
| 4,042,307 A | 8/1977 | Jarvis |
| 4,043,585 A | 8/1977 | Yamanaka |
| 4,158,511 A | 6/1979 | Herbenar |
| 4,169,297 A | 10/1979 | Weihrauch |
| 4,193,588 A | 3/1980 | Doneaux |
| 4,213,675 A | 7/1980 | Pilhall |
| 4,237,573 A | 12/1980 | Weihrauch |
| 4,267,680 A * | 5/1981 | Delattre ............ E04F 15/02405 52/384 |
| 4,300,851 A | 11/1981 | Thelander |
| 4,313,609 A | 2/1982 | Clements |
| 4,314,417 A | 2/1982 | Cain |
| 4,318,208 A | 3/1982 | Borja |
| 4,325,574 A | 4/1982 | Umemoto et al. |
| 4,358,166 A | 11/1982 | Antoine |
| 4,363,839 A | 12/1982 | Watanabe et al. |
| 4,364,150 A | 12/1982 | Remington |
| 4,384,803 A | 5/1983 | Cachia |
| 4,394,853 A | 7/1983 | Lopez-Crevillen et al. |
| 4,406,033 A | 9/1983 | Chisholm et al. |
| 4,407,413 A | 10/1983 | Jansson |
| 4,477,142 A | 10/1984 | Cooper |
| 4,481,160 A | 11/1984 | Bree |
| 4,527,760 A | 7/1985 | Salacuse |
| 4,564,232 A | 1/1986 | Fujimori et al. |
| 4,575,060 A | 3/1986 | Kitagawa |
| 4,591,203 A | 5/1986 | Furman |
| 4,599,768 A | 7/1986 | Doyle |
| 4,605,575 A | 8/1986 | Auld et al. |
| 4,616,951 A | 10/1986 | Maatela |
| 4,648,649 A | 3/1987 | Beal |
| 4,654,760 A | 3/1987 | Matheson et al. |
| 4,672,732 A | 6/1987 | Ramspacher |
| 4,745,656 A | 5/1988 | Revlett |
| 4,757,655 A | 7/1988 | Nentoft |
| 4,767,647 A | 8/1988 | Bree |
| 4,805,272 A | 2/1989 | Yamaguchi |
| 4,807,335 A | 2/1989 | Candea |
| 4,817,999 A | 4/1989 | Drew |
| 4,819,983 A | 4/1989 | Alexander et al. |
| 4,843,975 A | 7/1989 | Welsch |
| 4,843,976 A | 7/1989 | Pigott et al. |
| 4,865,502 A | 9/1989 | Maresch |
| 4,881,764 A | 11/1989 | Takahashi et al. |
| 4,917,426 A | 4/1990 | Copp |
| 4,973,212 A | 11/1990 | Jacobs |
| 4,977,648 A | 12/1990 | Eckerud |
| 5,005,265 A | 4/1991 | Muller |
| 5,039,267 A | 8/1991 | Wollar |
| 5,100,015 A | 3/1992 | Vanderstuyf |
| 5,111,557 A | 5/1992 | Baum |
| 5,139,285 A | 8/1992 | Lasinski |
| 5,154,479 A | 10/1992 | Sautter, Jr. |
| 5,165,749 A | 11/1992 | Sheppard |
| 5,170,985 A | 12/1992 | Killworth et al. |
| 5,180,219 A | 1/1993 | Geddie |
| 5,208,507 A | 5/1993 | Jung |
| 5,212,853 A | 5/1993 | Kaneko |
| 5,234,122 A | 8/1993 | Cherng |
| 5,250,001 A | 10/1993 | Hansen |
| 5,297,322 A | 3/1994 | Kraus |
| 5,309,663 A | 5/1994 | Shirley |
| 5,333,965 A | 8/1994 | Mailey |
| 5,339,491 A | 8/1994 | Sims |
| 5,342,139 A | 8/1994 | Hoffman |
| 5,348,356 A | 9/1994 | Moulton |
| 5,368,427 A | 11/1994 | Pfaffinger |
| 5,368,797 A | 11/1994 | Quentin et al. |
| 5,397,206 A | 3/1995 | Sihon |
| 5,407,310 A | 4/1995 | Kassouni |
| 5,446,965 A | 9/1995 | Makridis |
| 5,507,610 A | 4/1996 | Benedetti et al. |
| 5,513,603 A | 5/1996 | Ang et al. |
| 5,524,786 A | 6/1996 | Skudlarek |
| 5,538,079 A | 7/1996 | Pawlick |

(56) References Cited

U.S. PATENT DOCUMENTS

| | | |
|---|---|---|
| 5,556,808 A | 9/1996 | Williams et al. |
| 5,566,840 A | 10/1996 | Waldner |
| 5,575,601 A | 11/1996 | Skufca |
| 5,577,301 A | 11/1996 | DeMaagd |
| 5,577,779 A | 11/1996 | Dangel |
| 5,580,204 A | 12/1996 | Hultman |
| 5,586,372 A | 12/1996 | Eguchi et al. |
| 5,593,265 A | 1/1997 | Kizer |
| 5,601,453 A | 2/1997 | Horchler |
| 5,629,823 A | 5/1997 | Mizuta |
| 5,634,757 A | 6/1997 | Schanz |
| 5,639,140 A | 6/1997 | Labrash |
| 5,657,516 A | 8/1997 | Berg et al. |
| 5,666,749 A | 9/1997 | Waters |
| 5,667,271 A | 9/1997 | Booth |
| 5,670,013 A | 9/1997 | Huang et al. |
| 5,698,276 A | 12/1997 | Mirabitur |
| 5,702,779 A | 12/1997 | Siebelink, Jr. et al. |
| 5,706,559 A | 1/1998 | Oliver |
| 5,736,221 A | 4/1998 | Hardigg et al. |
| 5,765,942 A | 6/1998 | Shirai et al. |
| 5,775,860 A | 7/1998 | Meyer |
| 5,795,118 A | 8/1998 | Osada et al. |
| 5,797,170 A | 8/1998 | Akeno |
| 5,797,714 A | 8/1998 | Oddenino |
| 5,803,646 A | 9/1998 | Weihrauch |
| 5,806,915 A | 9/1998 | Takabatake |
| 5,810,535 A | 9/1998 | Fleckenstein et al. |
| 5,820,292 A | 10/1998 | Fremstad |
| 5,846,631 A | 12/1998 | Nowosiadly |
| 5,915,678 A | 6/1999 | Slocum et al. |
| 5,920,200 A | 7/1999 | Pendse |
| 5,929,382 A | 7/1999 | Moore |
| 5,931,514 A | 8/1999 | Chung |
| 5,934,729 A | 8/1999 | Baack |
| 5,941,673 A | 8/1999 | Hayakawa et al. |
| 5,988,678 A | 11/1999 | Nakamura |
| 6,006,941 A | 12/1999 | Hitchings |
| 6,010,306 A | 1/2000 | Bucher |
| 6,062,763 A | 5/2000 | Sirois et al. |
| 6,073,315 A | 6/2000 | Rasmussen |
| 6,079,083 A | 6/2000 | Akashi |
| 6,095,594 A | 8/2000 | Riddle et al. |
| 6,103,987 A | 8/2000 | Nordquist |
| 6,109,882 A | 8/2000 | Popov |
| 6,152,436 A | 11/2000 | Sonderegger et al. |
| 6,164,603 A | 12/2000 | Kawai |
| 6,193,430 B1 | 2/2001 | Culpepper et al. |
| 6,199,248 B1 | 3/2001 | Akashi |
| 6,202,962 B1 | 3/2001 | Snyder |
| 6,209,175 B1 | 4/2001 | Gershenson |
| 6,209,178 B1 | 4/2001 | Wiese et al. |
| 6,254,304 B1 | 7/2001 | Takizawa et al. |
| 6,264,869 B1 | 7/2001 | Notarpietro et al. |
| 6,283,540 B1 | 9/2001 | Siebelink, Jr. et al. |
| 6,286,214 B1 | 9/2001 | Bean |
| 6,289,560 B1 | 9/2001 | Guyot |
| 6,299,478 B1 | 10/2001 | Jones et al. |
| 6,311,960 B1 | 11/2001 | Pierman et al. |
| 6,318,585 B1 | 11/2001 | Asagiri |
| 6,321,495 B1 | 11/2001 | Oami |
| 6,336,767 B1 | 1/2002 | Nordquist et al. |
| 6,345,420 B1 | 2/2002 | Nabeshima |
| 6,349,904 B1 | 2/2002 | Polad |
| 6,351,380 B1 | 2/2002 | Curlee |
| 6,354,574 B1 | 3/2002 | Oliver et al. |
| 6,354,815 B1 | 3/2002 | Svihla et al. |
| 6,378,931 B1 | 4/2002 | Kolluri et al. |
| 6,398,449 B1 | 6/2002 | Loh |
| 6,470,540 B2 | 10/2002 | Aamodt et al. |
| 6,478,102 B1 | 11/2002 | Puterbaugh |
| 6,484,370 B2 | 11/2002 | Kanie et al. |
| 6,485,241 B1 | 11/2002 | Oxford |
| 6,498,297 B2 * | 12/2002 | Samhammer ........ H02G 3/0487 174/101 |
| 6,523,229 B2 | 2/2003 | Severson |
| 6,523,817 B1 | 2/2003 | Landry, Jr. |
| 6,533,391 B1 | 3/2003 | Pan |
| 6,543,979 B2 | 4/2003 | Iwatsuki |
| 6,557,260 B1 | 5/2003 | Morris |
| 6,568,701 B1 | 5/2003 | Burdack et al. |
| 6,579,397 B1 | 6/2003 | Spain et al. |
| 6,591,801 B1 | 7/2003 | Fonville |
| 6,609,717 B2 | 8/2003 | Hinson |
| 6,637,095 B2 | 10/2003 | Stumpf et al. |
| 6,658,698 B2 | 12/2003 | Chen |
| 6,662,411 B2 | 12/2003 | Rubenstein |
| 6,664,470 B2 | 12/2003 | Nagamoto |
| 6,668,424 B1 | 12/2003 | Allen |
| 6,677,065 B2 | 1/2004 | Blauer |
| 6,692,016 B2 | 2/2004 | Yokota |
| 6,712,329 B2 | 3/2004 | Ishigami et al. |
| 6,746,172 B2 | 6/2004 | Culpepper |
| 6,757,942 B2 | 7/2004 | Matsui |
| 6,799,758 B2 | 10/2004 | Fries |
| 6,821,091 B2 | 11/2004 | Lee |
| 6,840,969 B2 | 1/2005 | Kobayashi et al. |
| 6,857,676 B2 | 2/2005 | Kawaguchi et al. |
| 6,857,809 B2 | 2/2005 | Granata |
| 6,872,053 B2 | 3/2005 | Bucher |
| 6,908,117 B1 | 6/2005 | Pickett, Jr. et al. |
| 6,932,416 B2 | 8/2005 | Clauson |
| 6,948,753 B2 | 9/2005 | Yoshida et al. |
| 6,951,349 B2 | 10/2005 | Yokota |
| 6,957,939 B2 | 10/2005 | Wilson |
| 6,959,954 B2 | 11/2005 | Brandt et al. |
| 6,966,601 B2 | 11/2005 | Matsumoto et al. |
| 6,971,831 B2 | 12/2005 | Fattori et al. |
| 6,997,487 B2 | 2/2006 | Kitzis |
| 7,000,941 B2 | 2/2006 | Yokota |
| 7,008,003 B1 | 3/2006 | Hirose et al. |
| 7,014,094 B2 | 3/2006 | Alcoe |
| 7,017,239 B2 | 3/2006 | Kurily et al. |
| 7,036,779 B2 | 5/2006 | Kawaguchi et al. |
| 7,055,785 B1 | 6/2006 | Diggle, III |
| 7,055,849 B2 | 6/2006 | Yokota |
| 7,059,628 B2 | 6/2006 | Yokota |
| 7,073,260 B2 | 7/2006 | Jensen |
| 7,089,998 B2 | 8/2006 | Crook |
| 7,097,198 B2 | 8/2006 | Yokota |
| 7,121,611 B2 | 10/2006 | Hirotani et al. |
| 7,144,183 B2 | 12/2006 | Lian et al. |
| 7,172,210 B2 | 2/2007 | Yokota |
| 7,178,855 B2 | 2/2007 | Catron et al. |
| 7,198,315 B2 | 4/2007 | Cass et al. |
| 7,207,758 B2 | 4/2007 | Leon et al. |
| 7,234,852 B2 | 6/2007 | Nishizawa et al. |
| 7,275,296 B2 | 10/2007 | DiCesare |
| 7,306,418 B2 | 12/2007 | Kornblum |
| 7,322,500 B2 | 1/2008 | Maierholzner |
| 7,344,056 B2 | 3/2008 | Shelmon et al. |
| 7,360,964 B2 | 4/2008 | Tsuya |
| 7,369,408 B2 | 5/2008 | Chang |
| 7,435,031 B2 | 10/2008 | Granata |
| 7,454,105 B2 | 11/2008 | Yi |
| 7,487,884 B2 | 2/2009 | Kim |
| 7,493,716 B2 | 2/2009 | Brown |
| 7,500,440 B2 | 3/2009 | Chiu |
| 7,547,061 B2 | 6/2009 | Horimatsu |
| 7,557,051 B2 | 7/2009 | Ryu et al. |
| 7,568,316 B2 | 8/2009 | Choby et al. |
| 7,591,573 B2 | 9/2009 | Maliar et al. |
| D602,349 S | 10/2009 | Andersson |
| 7,614,836 B2 | 11/2009 | Mohiuddin |
| 7,672,126 B2 | 3/2010 | Yeh |
| 7,677,650 B2 | 3/2010 | Huttenlocher |
| 7,727,667 B2 | 6/2010 | Sakurai |
| 7,764,853 B2 | 7/2010 | Yi |
| 7,793,998 B2 | 9/2010 | Matsui et al. |
| 7,802,831 B2 | 9/2010 | Isayama et al. |
| 7,803,015 B2 | 9/2010 | Pham |
| 7,828,372 B2 | 11/2010 | Ellison |
| 7,832,693 B2 | 11/2010 | Moerke et al. |
| 7,862,272 B2 | 1/2011 | Nakajima |

(56) References Cited

U.S. PATENT DOCUMENTS

| | | |
|---|---|---|
| 7,869,003 B2 | 1/2011 | Van Doren et al. |
| 7,883,137 B2 | 2/2011 | Bar |
| 7,891,926 B2 | 2/2011 | Jackson, Jr. |
| 7,922,415 B2 | 4/2011 | Rudduck et al. |
| 7,946,684 B2 | 5/2011 | Drury et al. |
| 7,959,214 B2 | 6/2011 | Salhoff |
| 8,029,222 B2 | 10/2011 | Nitsche |
| 8,061,861 B2 | 11/2011 | Paxton et al. |
| 8,101,264 B2 | 1/2012 | Pace et al. |
| 8,136,819 B2 | 3/2012 | Yoshitsune et al. |
| 8,162,375 B2 | 4/2012 | Gurtatowski et al. |
| 8,203,496 B2 | 6/2012 | Miller et al. |
| 8,203,843 B2 | 6/2012 | Chen |
| 8,206,029 B2 | 6/2012 | Vaucher et al. |
| 8,228,640 B2 | 7/2012 | Woodhead et al. |
| 8,249,679 B2 | 8/2012 | Cui |
| 8,261,581 B2 | 9/2012 | Cerruti et al. |
| 8,263,889 B2 | 9/2012 | Takahashi et al. |
| 8,276,961 B2 | 10/2012 | Kwolek |
| 8,291,553 B2 | 10/2012 | Moberg |
| 8,297,137 B2 | 10/2012 | Dole |
| 8,297,661 B2 | 10/2012 | Proulx et al. |
| 8,312,887 B2 | 11/2012 | Dunn et al. |
| 8,371,788 B2 | 2/2013 | Lange |
| 8,414,048 B1 | 4/2013 | Kwolek |
| 8,424,173 B2 | 4/2013 | Shiba |
| 8,444,199 B2 | 5/2013 | Takeuchi et al. |
| 8,474,214 B2 | 7/2013 | Dawe |
| 8,480,186 B2 | 7/2013 | Wang |
| 8,511,707 B2 | 8/2013 | Amamori |
| 8,572,818 B2 | 11/2013 | Hofmann |
| 8,579,141 B2 | 11/2013 | Tejima |
| 8,619,504 B2 | 12/2013 | Wyssbrod |
| 8,677,573 B2 | 3/2014 | Lee |
| 8,695,201 B2 | 4/2014 | Morris |
| 8,720,016 B2 | 5/2014 | Beaulieu |
| 8,726,473 B2 | 5/2014 | Dole |
| 8,746,801 B2 | 6/2014 | Nakata |
| 8,773,846 B2 | 7/2014 | Wang |
| 8,811,004 B2 | 8/2014 | Liu |
| 8,826,499 B2 | 9/2014 | Tempesta |
| 8,833,771 B2 | 9/2014 | Lesnau |
| 8,833,832 B2 | 9/2014 | Whipps |
| 8,834,058 B2 | 9/2014 | Woicke |
| 8,905,812 B2 | 12/2014 | Pai-Chen |
| 8,910,350 B2 | 12/2014 | Poulakis |
| 9,003,891 B2 | 4/2015 | Frank |
| 9,039,318 B2 | 5/2015 | Mantei et al. |
| 9,050,690 B2 | 6/2015 | Hammer et al. |
| 9,061,403 B2 | 6/2015 | Colombo et al. |
| 9,061,715 B2 | 6/2015 | Morris |
| 9,062,991 B2 | 6/2015 | Kanagaraj |
| 9,067,625 B2 | 6/2015 | Morris |
| 9,194,413 B2 | 11/2015 | Christoph |
| 2001/0016986 A1 | 8/2001 | Bean |
| 2001/0030414 A1 | 10/2001 | Yokota |
| 2001/0045757 A1 | 11/2001 | Hideki et al. |
| 2002/0045086 A1 | 4/2002 | Tsuji et al. |
| 2002/0060275 A1 | 5/2002 | Polad |
| 2002/0092598 A1 | 7/2002 | Jones et al. |
| 2002/0130239 A1 | 9/2002 | Ishigami et al. |
| 2002/0136617 A1 | 9/2002 | Imahigashi |
| 2003/0007831 A1 | 1/2003 | Lian et al. |
| 2003/0059255 A1 | 3/2003 | Kirchen |
| 2003/0080131 A1 | 5/2003 | Fukuo |
| 2003/0082986 A1 | 5/2003 | Wiens et al. |
| 2003/0085618 A1 | 5/2003 | Rhodes |
| 2003/0087047 A1 | 5/2003 | Blauer |
| 2003/0108401 A1 | 6/2003 | Agha et al. |
| 2003/0180122 A1 | 9/2003 | Dobson |
| 2004/0028503 A1 | 2/2004 | Charles |
| 2004/0037637 A1 | 2/2004 | Lian et al. |
| 2004/0052574 A1 | 3/2004 | Grubb |
| 2004/0131896 A1 | 7/2004 | Blauer |
| 2004/0139678 A1 | 7/2004 | Pervan |
| 2004/0140651 A1 | 7/2004 | Yokota |
| 2004/0208728 A1 | 10/2004 | Fattori et al. |
| 2004/0262873 A1 | 12/2004 | Wolf et al. |
| 2005/0016116 A1 | 1/2005 | Scherff |
| 2005/0031946 A1 | 2/2005 | Kruger et al. |
| 2005/0042057 A1 | 2/2005 | Konig et al. |
| 2005/0054229 A1 | 3/2005 | Tsuya |
| 2005/0082449 A1 | 4/2005 | Kawaguchi et al. |
| 2005/0109489 A1 | 5/2005 | Kobayashi |
| 2005/0156409 A1 | 7/2005 | Yokota |
| 2005/0156410 A1 | 7/2005 | Yokota |
| 2005/0156416 A1 | 7/2005 | Yokota |
| 2005/0217088 A1 | 10/2005 | Lin |
| 2005/0244250 A1 | 11/2005 | Okada et al. |
| 2006/0082187 A1 | 4/2006 | Hernandez et al. |
| 2006/0092653 A1 | 5/2006 | Tachiiwa et al. |
| 2006/0102214 A1 | 5/2006 | Clemons |
| 2006/0110109 A1 | 5/2006 | Yu |
| 2006/0113755 A1 | 6/2006 | Yokota |
| 2006/0125286 A1 | 6/2006 | Horimatsu et al. |
| 2006/0141318 A1 | 6/2006 | MacKinnon et al. |
| 2006/0163902 A1 | 7/2006 | Engel |
| 2006/0170242 A1 | 8/2006 | Forrester et al. |
| 2006/0197356 A1 | 9/2006 | Catron et al. |
| 2006/0202449 A1 | 9/2006 | Yokota |
| 2006/0237995 A1 | 10/2006 | Huttenlocher |
| 2006/0249520 A1 | 11/2006 | DeMonte |
| 2006/0264076 A1 | 11/2006 | Chen |
| 2007/0034636 A1 | 2/2007 | Fukuo |
| 2007/0040411 A1 | 2/2007 | Dauvergne |
| 2007/0051572 A1 | 3/2007 | Beri |
| 2007/0113483 A1 | 5/2007 | Hernandez |
| 2007/0113485 A1 | 5/2007 | Hernandez |
| 2007/0126211 A1 | 6/2007 | Moerke et al. |
| 2007/0137018 A1 | 6/2007 | Aigner et al. |
| 2007/0144659 A1 | 6/2007 | De La Fuente |
| 2007/0205627 A1 | 9/2007 | Ishiguro |
| 2007/0227942 A1 | 10/2007 | Hirano |
| 2007/0251055 A1 | 11/2007 | Gerner |
| 2007/0258756 A1 | 11/2007 | Olshausen |
| 2007/0274777 A1 | 11/2007 | Winkler |
| 2007/0292205 A1 | 12/2007 | Duval |
| 2008/0014508 A1 | 1/2008 | Van Doren et al. |
| 2008/0018128 A1 | 1/2008 | Yamagiwa et al. |
| 2008/0073888 A1 | 3/2008 | Enriquez |
| 2008/0094447 A1 | 4/2008 | Drury et al. |
| 2008/0128346 A1 | 6/2008 | Bowers |
| 2008/0196535 A1 | 8/2008 | Dole |
| 2008/0217796 A1 | 9/2008 | Van Bruggen et al. |
| 2008/0260488 A1 | 10/2008 | Scroggie et al. |
| 2009/0028506 A1 | 1/2009 | Yi et al. |
| 2009/0072591 A1 | 3/2009 | Baumgartner |
| 2009/0091156 A1 | 4/2009 | Neubrand |
| 2009/0093111 A1 | 4/2009 | Buchwalter et al. |
| 2009/0126168 A1 | 5/2009 | Kobe et al. |
| 2009/0134652 A1 | 5/2009 | Araki |
| 2009/0140112 A1 | 6/2009 | Carnevali |
| 2009/0141449 A1 | 6/2009 | Yeh |
| 2009/0154303 A1 | 6/2009 | Vaucher et al. |
| 2009/0174207 A1 | 7/2009 | Lota |
| 2009/0211804 A1 | 8/2009 | Zhou et al. |
| 2009/0243172 A1 | 10/2009 | Ting et al. |
| 2009/0265896 A1 | 10/2009 | Beak |
| 2009/0309388 A1 | 12/2009 | Ellison |
| 2010/0000156 A1 | 1/2010 | Salhoff |
| 2010/0001539 A1 | 1/2010 | Kikuchi et al. |
| 2010/0021267 A1 | 1/2010 | Nitsche |
| 2010/0061045 A1 | 3/2010 | Chen |
| 2010/0102538 A1 | 4/2010 | Paxton et al. |
| 2010/0134128 A1 | 6/2010 | Hobbs |
| 2010/0147355 A1 | 6/2010 | Shimizu et al. |
| 2010/0162537 A1 | 7/2010 | Shiba |
| 2010/0232171 A1 | 9/2010 | Cannon |
| 2010/0247034 A1 | 9/2010 | Yi et al. |
| 2010/0263417 A1 | 10/2010 | Schoenow |
| 2010/0270745 A1 | 10/2010 | Hurlbert et al. |
| 2010/0307848 A1 | 12/2010 | Hashimoto |
| 2011/0012378 A1 | 1/2011 | Ueno et al. |
| 2011/0036542 A1 | 2/2011 | Woicke |

(56) References Cited

U.S. PATENT DOCUMENTS

| | | |
|---|---|---|
| 2011/0076588 A1 | 3/2011 | Yamaura |
| 2011/0083392 A1 | 4/2011 | Timko |
| 2011/0103884 A1 | 5/2011 | Shiomoto et al. |
| 2011/0119875 A1 | 5/2011 | Iwasaki |
| 2011/0131918 A1 | 6/2011 | Glynn |
| 2011/0154645 A1 | 6/2011 | Morgan |
| 2011/0175376 A1 | 7/2011 | Whitens et al. |
| 2011/0183152 A1 | 7/2011 | Lanham |
| 2011/0191990 A1 | 8/2011 | Beaulieu |
| 2011/0191993 A1 | 8/2011 | Forrest |
| 2011/0207024 A1 | 8/2011 | Bogumil et al. |
| 2011/0239418 A1 | 10/2011 | Huang |
| 2011/0296764 A1 | 12/2011 | Sawatani et al. |
| 2011/0311332 A1 | 12/2011 | Ishman |
| 2012/0000291 A1 | 1/2012 | Christoph |
| 2012/0000409 A1* | 1/2012 | Railey .................. B63B 35/79 114/55.5 |
| 2012/0020726 A1 | 1/2012 | Jan |
| 2012/0073094 A1 | 3/2012 | Bishop |
| 2012/0112489 A1 | 5/2012 | Okimoto |
| 2012/0115010 A1 | 5/2012 | Smith et al. |
| 2012/0187812 A1 | 7/2012 | Gerst |
| 2012/0240363 A1 | 9/2012 | Lee |
| 2012/0251226 A1 | 10/2012 | Liu et al. |
| 2012/0261951 A1 | 10/2012 | Mildner et al. |
| 2012/0301067 A1 | 11/2012 | Morgan |
| 2012/0311829 A1 | 12/2012 | Dickinson |
| 2012/0321379 A1 | 12/2012 | Wang et al. |
| 2012/0324795 A1 | 12/2012 | Krajenke et al. |
| 2013/0010413 A1 | 1/2013 | Kim |
| 2013/0017038 A1 | 1/2013 | Kestner et al. |
| 2013/0019454 A1 | 1/2013 | Colombo et al. |
| 2013/0019455 A1 | 1/2013 | Morris |
| 2013/0027852 A1 | 1/2013 | Wang |
| 2013/0055822 A1 | 3/2013 | Frank |
| 2013/0071181 A1 | 3/2013 | Herzinger et al. |
| 2013/0157015 A1 | 6/2013 | Morris |
| 2013/0212858 A1 | 8/2013 | Herzinger et al. |
| 2013/0269873 A1 | 10/2013 | Herzinger et al. |
| 2013/0287992 A1 | 10/2013 | Morris |
| 2014/0033493 A1 | 2/2014 | Morris et al. |
| 2014/0041176 A1 | 2/2014 | Morris |
| 2014/0041185 A1 | 2/2014 | Morris et al. |
| 2014/0041199 A1 | 2/2014 | Morris |
| 2014/0042704 A1 | 2/2014 | Polewarczyk |
| 2014/0047691 A1 | 2/2014 | Colombo et al. |
| 2014/0047697 A1 | 2/2014 | Morris |
| 2014/0080036 A1 | 3/2014 | Smith et al. |
| 2014/0132023 A1 | 5/2014 | Watanabe |
| 2014/0157578 A1 | 6/2014 | Morris et al. |
| 2014/0159412 A1 | 6/2014 | Morris et al. |
| 2014/0172112 A1 | 6/2014 | Marter |
| 2014/0175774 A1 | 6/2014 | Kansteiner |
| 2014/0199116 A1 | 7/2014 | Metten et al. |
| 2014/0202628 A1 | 7/2014 | Sreetharan et al. |
| 2014/0208561 A1 | 7/2014 | Colombo et al. |
| 2014/0208572 A1 | 7/2014 | Colombo et al. |
| 2014/0220267 A1 | 8/2014 | Morris et al. |
| 2014/0264206 A1 | 9/2014 | Morris |
| 2014/0292013 A1 | 10/2014 | Colombo et al. |
| 2014/0298638 A1 | 10/2014 | Colombo et al. |
| 2014/0298640 A1 | 10/2014 | Morris et al. |
| 2014/0298962 A1 | 10/2014 | Morris et al. |
| 2014/0300130 A1 | 10/2014 | Morris et al. |
| 2014/0301103 A1 | 10/2014 | Colombo et al. |
| 2014/0301777 A1 | 10/2014 | Morris et al. |
| 2014/0301778 A1 | 10/2014 | Morris et al. |
| 2014/0360824 A1 | 12/2014 | Morris et al. |
| 2014/0360826 A1 | 12/2014 | Morris et al. |
| 2014/0366326 A1 | 12/2014 | Colombo et al. |
| 2014/0369742 A1 | 12/2014 | Morris et al. |
| 2014/0369743 A1 | 12/2014 | Morris et al. |
| 2015/0016864 A1 | 1/2015 | Morris et al. |
| 2015/0016918 A1 | 1/2015 | Colombo |
| 2015/0023724 A1 | 1/2015 | Morris et al. |
| 2015/0043959 A1 | 2/2015 | Morris |
| 2015/0050068 A1 | 2/2015 | Morris et al. |
| 2015/0052725 A1 | 2/2015 | Morris et al. |
| 2015/0056009 A1 | 2/2015 | Morris |
| 2015/0063943 A1 | 3/2015 | Morris |
| 2015/0078805 A1 | 3/2015 | Morris et al. |
| 2015/0086265 A1 | 3/2015 | Morris |
| 2015/0093177 A1 | 4/2015 | Morris |
| 2015/0093178 A1 | 4/2015 | Morris |
| 2015/0093179 A1 | 4/2015 | Morris et al. |
| 2015/0098748 A1 | 4/2015 | Morris et al. |
| 2015/0135509 A1 | 5/2015 | Morris et al. |
| 2015/0165609 A1 | 6/2015 | Morris et al. |
| 2015/0165985 A1 | 6/2015 | Morris |
| 2015/0165986 A1 | 6/2015 | Morris |
| 2015/0166124 A1 | 6/2015 | Morris |
| 2015/0167717 A1 | 6/2015 | Morris |
| 2015/0167718 A1 | 6/2015 | Morris et al. |
| 2015/0174740 A1 | 6/2015 | Morris et al. |
| 2015/0175091 A1 | 6/2015 | Morris et al. |
| 2015/0175217 A1 | 6/2015 | Morris et al. |
| 2015/0175219 A1 | 6/2015 | Kiester |
| 2015/0176759 A1 | 6/2015 | Morris et al. |
| 2015/0232130 A1 | 8/2015 | Colombo |
| 2015/0375798 A1 | 12/2015 | Morris et al. |

FOREIGN PATENT DOCUMENTS

| | | |
|---|---|---|
| CN | 1036250 A | 10/1989 |
| CN | 1062629 A | 7/1992 |
| CN | 1129162 A | 8/1996 |
| CN | 2285844 Y | 7/1998 |
| CN | 1205285 A | 1/1999 |
| CN | 1204744 A | 7/1999 |
| CN | 1328521 A | 12/2001 |
| CN | 1426872 A | 7/2003 |
| CN | 1496451 A | 5/2004 |
| CN | 2661972 Y | 12/2004 |
| CN | 2679409 Y | 2/2005 |
| CN | 1670986 A | 9/2005 |
| CN | 100573975 C | 9/2005 |
| CN | 1693721 A | 11/2005 |
| CN | 1771399 A | 5/2006 |
| CN | 1774580 A | 5/2006 |
| CN | 2872795 Y | 2/2007 |
| CN | 1933747 A | 3/2007 |
| CN | 2888807 Y | 4/2007 |
| CN | 1961157 A | 5/2007 |
| CN | 2915389 Y | 6/2007 |
| CN | 101005741 A | 7/2007 |
| CN | 200941716 Y | 8/2007 |
| CN | 200957794 Y | 10/2007 |
| CN | 101250964 A | 4/2008 |
| CN | 101390022 A | 3/2009 |
| CN | 201259846 Y | 6/2009 |
| CN | 201268336 Y | 7/2009 |
| CN | 201310827 Y | 9/2009 |
| CN | 201540513 U | 8/2010 |
| CN | 101821534 | 9/2010 |
| CN | 101930253 A | 12/2010 |
| CN | 201703439 U | 1/2011 |
| CN | 201737062 U | 2/2011 |
| CN | 201792722 U | 4/2011 |
| CN | 201818606 U | 5/2011 |
| CN | 201890285 U | 7/2011 |
| CN | 102144102 A | 8/2011 |
| CN | 102235402 A | 11/2011 |
| CN | 202024057 U | 11/2011 |
| CN | 202079532 U | 12/2011 |
| CN | 102313952 A | 1/2012 |
| CN | 202132326 U | 2/2012 |
| CN | 102540855 A | 7/2012 |
| CN | 102756633 | 10/2012 |
| CN | 102803753 A | 11/2012 |
| CN | 202561269 U | 11/2012 |
| CN | 102817892 A | 12/2012 |
| CN | 102869891 A | 1/2013 |
| CN | 102904128 A | 1/2013 |
| CN | 202686206 U | 1/2013 |

(56) References Cited

FOREIGN PATENT DOCUMENTS

| | | |
|---|---|---|
| CN | 102918315 A | 2/2013 |
| CN | 102939022 A | 2/2013 |
| CN | 202764872 U | 3/2013 |
| CN | 202987018 U | 6/2013 |
| CN | 103201525 A | 7/2013 |
| CN | 103206595 A | 7/2013 |
| CN | 103206596 A | 7/2013 |
| CN | 203189459 U | 9/2013 |
| CN | 203344856 U | 12/2013 |
| CN | 104100609 A | 10/2014 |
| CN | 203991175 U | 12/2014 |
| DE | 1220673 B | 7/1966 |
| DE | 2527023 A1 | 12/1976 |
| DE | 2736012 A1 | 2/1978 |
| DE | 2703897 A1 | 8/1978 |
| DE | 2809746 A1 | 9/1979 |
| DE | 3008990 A1 | 9/1980 |
| DE | 3704190 A1 | 12/1987 |
| DE | 3711696 A1 | 10/1988 |
| DE | 3805693 A1 | 2/1989 |
| DE | 3815927 | 11/1989 |
| DE | 9109276 U1 | 7/1991 |
| DE | 4002443 A1 | 8/1991 |
| DE | 4111245 A1 | 10/1991 |
| DE | 9201258 U1 | 3/1992 |
| DE | 29714892 U1 | 10/1997 |
| DE | 29800379 U1 | 5/1998 |
| DE | 69600357 T2 | 12/1998 |
| DE | 10202644 C1 | 6/2003 |
| DE | 10234253 B3 | 4/2004 |
| DE | 10333540 A1 | 2/2005 |
| DE | 60105817 T2 | 2/2006 |
| DE | 202007006175 U1 | 8/2007 |
| DE | 102008005618 A1 | 7/2009 |
| DE | 102008063920 A1 | 9/2009 |
| DE | 102008047464 A1 | 4/2010 |
| DE | 102010028323 A1 | 11/2011 |
| DE | 102011050003 A1 | 10/2012 |
| DE | 102012212101 B3 | 7/2013 |
| DE | 102013003028 A1 | 3/2014 |
| EP | 0118796 | 9/1984 |
| EP | 0616140 A2 | 9/1994 |
| EP | 1132263 A1 | 9/2001 |
| EP | 1243471 A2 | 9/2002 |
| EP | 1273766 A1 | 1/2003 |
| EP | 1293384 A2 | 3/2003 |
| EP | 1384536 A2 | 1/2004 |
| EP | 1388449 A1 | 2/2004 |
| EP | 1452745 A1 | 9/2004 |
| EP | 1550818 A1 | 7/2005 |
| EP | 2166235 A2 | 3/2010 |
| EP | 2450259 A1 | 5/2012 |
| EP | 2458454 A1 | 5/2012 |
| FR | 1369198 A | 8/1964 |
| FR | 2009941 A1 | 2/1970 |
| FR | 2750177 A2 | 12/1997 |
| FR | 2942749 A1 | 9/2010 |
| FR | 2958696 A1 | 10/2011 |
| GB | 155838 | 3/1922 |
| GB | 994891 | 6/1965 |
| GB | 2175626 A | 12/1986 |
| GB | 2281950 A | 3/1995 |
| GB | 2348924 A | 10/2000 |
| JP | S6054264 A | 3/1985 |
| JP | H08200420 A | 8/1996 |
| JP | H0942233 A | 2/1997 |
| JP | 2000010514 A | 1/2000 |
| JP | 2000287717 A | 10/2000 |
| JP | 2001141154 A | 5/2001 |
| JP | 2001171554 A | 6/2001 |
| JP | 2003158387 A | 5/2003 |
| JP | 2003314515 A | 11/2003 |
| JP | 2005268004 | 9/2005 |
| JP | 2006205918 | 8/2006 |
| JP | 2008307938 A | 12/2008 |
| JP | 2009084844 | 4/2009 |
| JP | 2009187789 A | 8/2009 |
| JP | 2011085174 A | 4/2011 |
| JP | 2012060791 A | 3/2012 |
| JP | 2012112533 A | 6/2012 |
| KR | 20030000251 A1 | 1/2003 |
| KR | 100931019 B1 | 12/2009 |
| WO | 9602963 A1 | 2/1996 |
| WO | 9822739 A1 | 5/1998 |
| WO | 0055517 A2 | 3/2000 |
| WO | 0132454 A3 | 11/2001 |
| WO | 2004010011 | 1/2004 |
| WO | 2007126201 A1 | 11/2007 |
| WO | 2008140659 A1 | 11/2008 |
| WO | 2010105354 A1 | 9/2010 |
| WO | 2011025606 | 3/2011 |
| WO | 2013088447 A1 | 6/2013 |
| WO | 2013191622 A1 | 12/2013 |

OTHER PUBLICATIONS

"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, V. 26, No. 3, Elsevier Publishing, Jul. 2002.

"The Design of High Precision Parallel Mechnisms Using Binary Actuation and Elastic Averaging: With Application to MRI Cancer Treatment" by L.M. Devita, J.S. Plante, and S. Dubowsky, 12th IFToMM World Congress (France), Jun. 2007.

"Passive Alignment of Micro-Fluidic Chips Using the Principle of Elastic Averaging" by Sitanshu Gurung, Thesis, Louisiana State University, Dept. of Mechanical Engineering, Dec. 2007.

"Precision Connector Assembly Using Elastic Averaging" by Patrick J. Willoughby and Alexander H. Slocum, Massachusetts Institute of Technology (MIT), Cambridge, MA, American Society for Precision Engineering, 2004.

U.S. Appl. No. 13/229,926, filed Sep. 12, 2011, entitled "Using Elastic Averaging for Alignment of Battery Stack, Fuel Cell Stack, or Other Vehicle Assembly", inventors: Mark A. Smith, Ronald Daul, Xiang Zhao, David Okonski, Elmer Santos, Lane Lindstrom, and Jeffrey A. Abell.

U.S. Appl. No. 13/330,718, filed Dec. 20, 2011, entitled "Precisely Locating Components in an Infrared Welded Assembly", inventor: Steven E. Morris.

U.S. Appl. No. 13/459,118, filed Apr. 28, 2012, entitled "Stiffened Multi-Layer Compartment Door Assembly Utilizing Elastic Averaging," inventor: Steven E. Morris.

U.S. Appl. No. 13/567,580, filed Aug. 6, 2012, entitled "Semi-Circular Alignment Features of an Elastic Averaging Alignment System", inventors: Steven E. Morris and Thomas F. Bowles.

U.S. Appl. No. 13/570,959, filed Aug. 9, 2012, entitled "Elastic Cantilever Beam Alignment System for Precisely Aligning Components", inventor: Steven E. Morris.

U.S. Appl. No. 13/571,030, filed Aug. 9, 2012, entitled "Elastic Tube Alignment System for Precisely Locating an Emblem Lens to an Outer Bezel", inventors: Joel Colombo, Steven E. Morris, and Michael D. Richardson.

U.S. Appl. No. 13/752,449, filed Jan. 29, 2013, entitled "Elastic Insert Alignment Assembly and Method of Reducing Positional Variation", inventors: Steven E. Morris and Michael D. Richardson.

U.S. Appl. No. 13/755,759, filed Jan. 31, 2013, entitled "Elastic Alignment Assembly for Aligning Mated Components and Method of Reducing Positional Variation", inventors: Joel Colombo, Michael D. Richardson, and Steven E. Morris.

U.S. Appl. No. 13/851,222, filed Mar. 27, 2013, entitled "Elastically Averaged Alignment System", inventors: Joel Colombo and Steven E Morris.

U.S. Appl. No. 13/855,928, filed Apr. 3, 2013, entitled "Elastic Averaging Alignment System, Method of Making the Same and Cutting Punch Therefor", inventors: Steven E. Morris, Jennifer P. Lawall, Joel Colombo, and Jeffrey L. Konchan.

(56) References Cited

OTHER PUBLICATIONS

U.S. Appl. No. 13/856,888, filed Apr. 4, 2013, entitled "Elastic Retaining Assembly for Matable Components and Method of Assembling", inventors: Steven E. Morris, Jennifer P. Lawall, Joel Colombo, and Toure D. Lee.
U.S. Appl. No. 13/856,927, filed Apr. 4, 2013, entitled "Elastic Tubular Attachment Assembly for Mating Components and Method of Mating Components ", inventors: Steven E Morris and Jennifer P. Lawall.
U.S. Appl. No. 13/856,956, filed Apr. 4, 2013, entitled "Elastic Clip Retaining Arrangement and Method of Mating Structures with an Elastic Clip Retaining Arrangement ", inventors: Joel Colombo, Steven E. Morris and Jeffrey L. Konchan.
U.S. Appl. No. 13/856,973, filed Apr. 4, 2013, entitled "Elastically Deformable Flange Locator Arrangement and Method of Reducing Positional Variation ", inventors: Joel Colombo, Steven E. Morris and Michael D. Richardson.
U.S. Appl. No. 13/858,478, filed Apr. 8, 2013, entitled "Elastic Mating Assembly and Method of Elastically Assembling Matable Components", inventors: Steven E Morris and Jennifer P. Lawall.
U.S. Appl. No. 13/859,109, filed Apr. 9, 2013, entitled "Elastic Retaining Arrangement for Jointed Components and Method of Reducing a Gap Between Jointed Components," inventors: Steven E. Morris, James M. Kushner, Victoria L. Enyedy, Jennifer P. Lawall, and Piotr J. Ogonek.
U.S. Appl. No. 13/915,132, filed Jun. 11, 2013, entitled "Elastically Deformable Energy Management Arrangement and Method of Managing Energy Absorption," inventors: Steven E. Morris, Randy A. Johnson and Jennifer P. Lawall.
U.S. Appl. No. 13/915,177, filed Jun. 11, 2013, entitled "Elastically Deformable Energy Management Assembly and Method of Managing Energy Absorption," inventors: Steven E. Morris, Jennifer P. Lawall, and Randy Johnson.
U.S. Appl. No. 13/917,005, filed Jun. 13, 2013, entitled "Elastic Attachment Assembly and Method of Reducing Positional Variation and Increasing Stiffness," inventors: Steven E Morris and Jennifer P. Lawall.
U.S. Appl. No. 13/917,074, filed Jun. 13, 2013, entitled "Elastically Deformable Retaining Hook for Components to be Mated Together and Method of Assembling", inventors: Joel Colombo, Jeffrey L. Konchan, Steven E. Morris, and Steve J. Briggs.
U.S. Appl. No. 13/918,183, filed Jun. 14, 2013, entitled "Elastic Retaining Assembly for Matable Components and Method of Assembling," inventors: Steven E. Morris and Jennifer P. Lawall.
"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.
U.S. Appl. No. 13/939,503, filed Jul. 11, 2013, entitled "Elastically Averaged Alignment Systems and Methods," inventor: Joel Colombo.
U.S. Appl. No. 13/940,912, filed Jul. 12, 2013, entitled "Alignment Arrangement for Mated Components and Method", inventors: Steven E. Morris and Jennifer P. Lawall.
U.S. Appl. No. 13/945,231, filed Jul. 18, 2013, entitled "Lobular Elastic Tube Alignment System for Providing Precise Four-Way Alignment of Components", Inventors: Steven E. Morris and Jennifer P. Lawall.
U.S. Appl. No. 13/954,198, filed Jul. 30, 2013, entitled "Elastic Alignment and Retention System and Method," inventors: Steven E. Morris, Edward D. Groninger, and Raymond J. Chess.
U.S. Appl. No. 13/966,523, filed Aug. 14, 2013, entitled "Elastically Averaged Alignment Systems and Methods Thereof," inventors: Steven E. Morris, Jennifer P. Lawall and Joel Colombo.
U.S. Appl. No. 13/973,587, filed Aug. 22, 2013, entitled "Elastic Averaging Alignment System and Method," inventors: Steven E. Morris and Jennifer P. Lawall.
U.S. Appl. No. 13/974,729, filed Aug. 23, 2013, entitled "Elastic Averaging Snap Member Aligning and Fastening System", inventors: Steven E. Morris and Jennifer P. Lawall.
U.S. Appl. No. 14/012,205, filed Aug. 28, 2013, entitled "Elastically Deformable Alignment Fastener and System," inventors: Steven E. Morris, Marc J. Tahnoose, Michael E. McGuire and Jennifer P. Lawall.
U.S. Appl. No. 14/021,282, filed Sep. 9, 2013, entitled "Elastic Tube Alignment and Fastening System for Providing Precise Alignment and Fastening of Components," inventors: Steven E. Morris and Jennifer P. Lawall.
U.S. Appl. No. 14/031,647, filed Sep. 19, 2013, entitled "Elastically Averaged Alignment Systems and Methods," inventors: Steven E. Morris, Joel Colombo, Jennifer P. Lawall, Jeffrey L. Konchan, and Steve J. Briggs.
U.S. Appl. No. 14/038,241, filed Sep. 26, 2013, entitled "Serviceable Aligning and Self-Retaining Elastic Arrangement for Mated Components and Method," inventors: Steven E. Morris, Jennifer P. Lawall and Joel Colombo.
U.S. Appl. No. 14/039,614, filed Sep. 27, 2013, entitled "Elastically Averaged Alignment Systems and Methods," inventor: Steven E. Morris.
U.S. Appl. No. 14/044,199, filed Oct. 2, 2013, entitled "Lobular Elastic Tube Alignment and Retention System for Providing Precise Alignment of Components," inventors: Steven E. Morris and Jennifer P. Lawall.
U.S. Appl. No. 14/044,207, filed Oct. 2, 2013, entitled "Elastic Aperture Alignment System for Providing Precise Four-Way Alignment of Components," inventors: Steven E. Morris and Jennifer P. Lawall.
U.S. Appl. No. 14/045,463, filed Oct. 3, 2013, entitled "Elastically Averaged Alignment Systems and Methods," inventors: Steven E. Morris and Jennifer P. Lawall.
U.S. Appl. No. 14/081,361, filed Nov. 15, 2013, entitled "Elastically Deformable Clip and Method," inventors: Steven E. Morris, Jennifer P. Lawall and Jeffrey M. Gace.
U.S. Appl. No. 14/104,321, filed Dec. 12, 2013, entitled "Alignment and Retention System for a Flexible Assembly," inventors: Steven E. Morris and Jennifer P. Lawall.
U.S. Appl. No. 14/104,327, filed Dec. 12, 2013, entitled "Self-Retaining Alignment System for Providing Precise Alignment and Retention of Components," inventors: Steven E. Morris, Jennifer P. Lawall and Toure D. Lee.
U.S. Appl. No. 14/104,333, filed Dec. 12, 2013, entitled "Alignment System for Providing Precise Alignment and Retention of Components of a Sealable Compartment, " inventors: Steven E. Morris, Christopher J. Georgi, Jennifer P. Lawall and Gordan N. Noll.
U.S. Appl. No. 14/104,541, filed Dec. 12, 2013, entitled "Alignment and Retention System for Providing Precise Alignment and Retention of Components," inventors: Steven E. Morris and Jennifer P. Lawall.
U.S. Appl. No. 14/104,549, filed Dec. 12, 2013, entitled "Alignment System for Providing Alignment of Components Having Contoured Features," inventors: Steven E. Morris and Jennifer P. Lawall.
U.S. Appl. No. 14/108,921, filed Dec. 17, 2013, entitled "Elastically Averaged Alignment Systems and Methods Thereof," inventors: Steven E. Morris and Jennifer P. Lawall.
U.S. Appl. No. 14/108,931, filed Dec. 17, 2013, entitled "Elastically Averaged Strap Systems and Methods," inventors: Steven E. Morris and Jennifer P. Lawall.
U.S. Appl. No. 14/109,296, filed Dec. 17, 2013, entitled "Fastener for Operatively Coupling Matable Components, " inventors: Steven E. Morris and Jennifer P. Lawall.
U.S. Appl. No. 14/134,622, filed Dec. 19, 2013, entitled "Elastic Averaging Alignment Member," inventors: Steven E. Morris and Jennifer P. Lawall.
U.S. Appl. No. 14/134,801, filed Dec. 19, 2013, entitled "Elastically Averaged Alignment Systems and Methods," inventors: Steven E. Morris and Jennifer P. Lawall.
U.S. Appl. No. 14/134,844, filed Dec. 19, 2013, entitled "Elastically Deformable Module Installation Assembly," inventors: Steven E. Morris and Jennifer P. Lawall.

(56) References Cited

OTHER PUBLICATIONS

U.S. Appl. No. 14/134,888, filed Dec. 19, 2013, entitled "Elastic Retaining Assembly and Method," inventors: Steven E. Morris and Jennifer P. Lawall.
U.S. Appl. No. 14/136,502, filed Dec. 20, 2013, entitled "Elastically Averaged Alignment Systems and Methods," inventors: Timothy A. Kiester, Steven E. Morris, Kenton L. West, Scott J. Fast, and Evan Phillips.
U.S. Appl. No. 14/151,279, filed Jan. 9, 2014, entitled "Elastically Averaged Alignment Systems and Methods," inventors: Steven E. Morris and Jennifer P. Lawall.
U.S. Appl. No. 14/153,741, filed Jan. 13, 2014, entitled "Elastically Averaged Assembly for Closure Applications," inventors: Steven E. Morris, Jeffrey A. Abell, Jennifer P. Lawall, and Jeffrey L. Konchan.
U.S. Appl. No. 14/180,882, filed Feb. 14, 2014, entitled "Elastic Tube Alignment System for Precisely Locating Components," inventor: Steven E. Morris.
U.S. Appl. No. 14/181,142, filed Feb. 14, 2014, entitled "Elastic Tube Alignment System for Precisely Locating Components," inventor: Steven E. Morris.
U.S. Appl. No. 14/185,422, filed Feb. 20, 2014, entitled "Elastically Averaged Alignment Systems and Methods," inventors: Joel Colombo, Steven E. Morris, Jennifer P. Lawall and Ashish M. Gollapalli.
U.S. Appl. No. 14/185,472, filed Feb. 20, 2014, entitled "Elastically Averaged Alignment Systems and Method," inventors: Steven E. Morris, Jennifer P. Lawall and Kee Hyuk Im.
U.S. Appl. No. 14/231,395, filed Mar. 31, 2014, entitled "Elastically Averaged Alignment Systems and Methods," inventors: Joel Colombo, Steven E. Morris, Jennifer P. Lawall, and Ashish M. Gollapalli.
U.S. Appl. No. 14/249,746, filed Apr. 10, 2014, entitled "Elastically Averaged Alignment Systems and Methods," inventors: Joel Colombo and Catherine A. Ostrander.
U.S. Appl. No. 14/259,747, filed Apr. 23, 2014, entitled "System for Elastically Averaging Assembly of Components," inventors: Steven E. Morris and Jennifer P. Lawall.
Cross-sectional view of a prior art infrared welded assembly of BMW, Munich, Germany. Believed on the market since about Jan. 1, 2010.
Office Action for Chinese Patent Application for Invention No. 201510010782.1 dated Jul. 4, 2016, Chinese Office Action related to U.S. Appl. No. 14/151,279; 7 pages.
Rojas, F.E., et al., "Kinematic Coupling for Precision Fixturing & Assembly" MIT Precision Engineering Research Group, Apr. 2013; 24 pgs.
Slocum, A.H., et al., "Kinematic and Elastically Averaged Joints: Connecting the Past, Present and Future" International Symposium on Ultraprecision Engineering and Nanotechnology, Tokyo, Japan, Mar. 13, 2013; 4 pgs.
Willoughby, P., "Elastically Averaged Precision Alignment", Degree of Doctor of Philosophy in Mechanical Engineering Dissertation, Massachusetts Institute of Technology, 2005; 158 pgs.

* cited by examiner

ELASTICALLY AVERAGED ALIGNMENT SYSTEMS AND METHODS

FIELD OF THE INVENTION

The subject invention relates to matable components and, more specifically, to elastically averaged matable components for alignment and retention.

BACKGROUND

Components, in particular vehicular components which are to be mated together in a manufacturing process, may be mutually located with respect to each other by alignment features that are oversized holes and/or undersized upstanding bosses. Such alignment features are typically sized to provide spacing to freely move the components relative to one another to align them without creating an interference therebetween that would hinder the manufacturing process. One such example includes two-way and/or four-way male alignment features; typically upstanding bosses, which are received into corresponding female alignment features, typically apertures in the form of slots or holes. The components are formed with a predetermined clearance between the male alignment features and their respective female alignment features to match anticipated size and positional variation tolerances of the male and female alignment features that result from manufacturing (or fabrication) variances.

As a result, significant positional variation can occur between two mated components having the aforementioned alignment features, which may contribute to the presence of undesirably large variation in their alignment, particularly with regard to gaps and/or spacing therebetween. In the case where misaligned components are also part of another assembly, such misalignment may also affect the function and/or aesthetic appearance of the entire assembly. Regardless of whether such misalignment is limited to two components or an entire assembly, it can negatively affect function and may result in a perception of poor quality. Moreover, clearance between misaligned components may lead to relative motion therebetween, which may cause undesirable noise such as squeaking and rattling.

SUMMARY OF THE INVENTION

In one aspect, a component for an elastically averaged alignment system is provided. The component includes a body, an inner wall formed in the body and defining an alignment aperture, and an alignment member. The alignment member includes a pair of tabs extending from the body, and the alignment member is an elastically deformable material such that when the alignment member is inserted into another alignment aperture of another component, the alignment member elastically deforms to an elastically averaged configuration to facilitate aligning the component relative to the another component of the elastically averaged alignment system. The alignment aperture is configured to receive another alignment member of another component of the elastically averaged alignment system.

In another aspect, an elastically averaged alignment system is provided. The system includes a first component and a second component. Each of the first and second components includes a body, an inner wall formed in the body and defining an alignment aperture, and an alignment member. Each alignment member includes a pair of tabs extending from the body, and the alignment member is an elastically deformable material such that when the first component alignment member is inserted into the second component alignment aperture, the first component alignment member elastically deforms to an elastically averaged configuration to facilitate aligning and stacking the first component relative to the second component.

In yet another aspect, a method of manufacturing an elastically averaged alignment system is provided. The method includes forming a first and a second component each comprising a body, an inner wall formed in the body and defining an alignment aperture, and an alignment member having a pair of tabs extending from the body. The method further includes forming the alignment members from an elastically deformable material such that when the first component alignment member is inserted into the second component alignment aperture, the first component alignment aperture elastically deforms to an elastically averaged configuration to facilitate aligning and stacking the first component relative to the second component.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

The following description is merely exemplary in nature and is not intended to limit the present disclosure, its application or uses. For example, the embodiments shown are applicable to vehicle body panels, but the alignment system disclosed herein may be used with any suitable components to provide elastic averaging for precision location and alignment of all manner of mating components and component applications, including many industrial, consumer product (e.g., consumer electronics, various appliances and the like), transportation, energy and aerospace applications, and particularly including many other types of vehicular components and applications, such as various interior, exterior and under hood vehicular components and applications. It should be understood that throughout the drawings, corresponding reference numerals indicate like or corresponding parts and features.

As used herein, the term "elastically deformable" refers to components, or portions of components, including component features, comprising materials having a generally elastic deformation characteristic, wherein the material is configured to undergo a resiliently reversible change in its shape, size, or both, in response to the application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. In some embodiments, the elastically deformable component configured to have the at least one feature and associated mating feature disclosed herein may require more than one of such features, depending on the requirements of a particular embodiment. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned, co-pending U.S. patent application Ser. No. 13/187,675, published as U.S. Pub. No. 2013/0019455, the disclosure of which is incorporated by reference herein in its entirety. The embodiments disclosed above provide the ability to convert an existing component that is not compatible with the above-described elastic averaging principles, or that would be further aided with the inclusion of a four-way elastic averaging system as herein disclosed, to an assembly that does facilitate elastic averaging and the benefits associated therewith.

Any suitable elastically deformable material may be used for the mating components and alignment features disclosed herein and discussed further below, particularly those materials that are elastically deformable when formed into the features described herein. This includes various metals, polymers, ceramics, inorganic materials or glasses, or composites of any of the aforementioned materials, or any other combinations thereof suitable for a purpose disclosed herein. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS). The material may be in any form and formed or manufactured by any suitable process, including stamped or formed metal, composite or other sheets, forgings, extruded parts, pressed parts, castings, or molded parts and the like, to include the deformable features described herein. The elastically deformable alignment features and associated component may be formed in any suitable manner. For example, the elastically deformable alignment features and the associated component may be integrally formed, or they may be formed entirely separately and subsequently attached together. When integrally formed, they may be formed as a single part from a plastic injection molding machine, for example. When formed separately, they may be formed from different materials to provide a predetermined elastic response characteristic, for example. The material, or materials, may be selected to provide a predetermined elastic response characteristic of any or all of the elastically deformable alignment features, the associated component, or the mating component. The predetermined elastic response characteristic may include, for example, a predetermined elastic modulus.

As used herein, the term vehicle is not limited to just an automobile, truck, van or sport utility vehicle, but includes any self-propelled or towed conveyance suitable for transporting a burden.

Described herein are alignment and retention systems, as well as methods for elastically averaged mating assemblies. The alignment and retention systems include components having both male and female elastic alignment features that facilitate elastically averaged mating with another of the same or similar component. As such, the components may be generally modular and facilitate simple module manufacture, provide easy assembly into a system formed from the multiple modular components, and facilitate maintaining a proper coupling between, and desired orientation of, two or more components.

Figure 1:
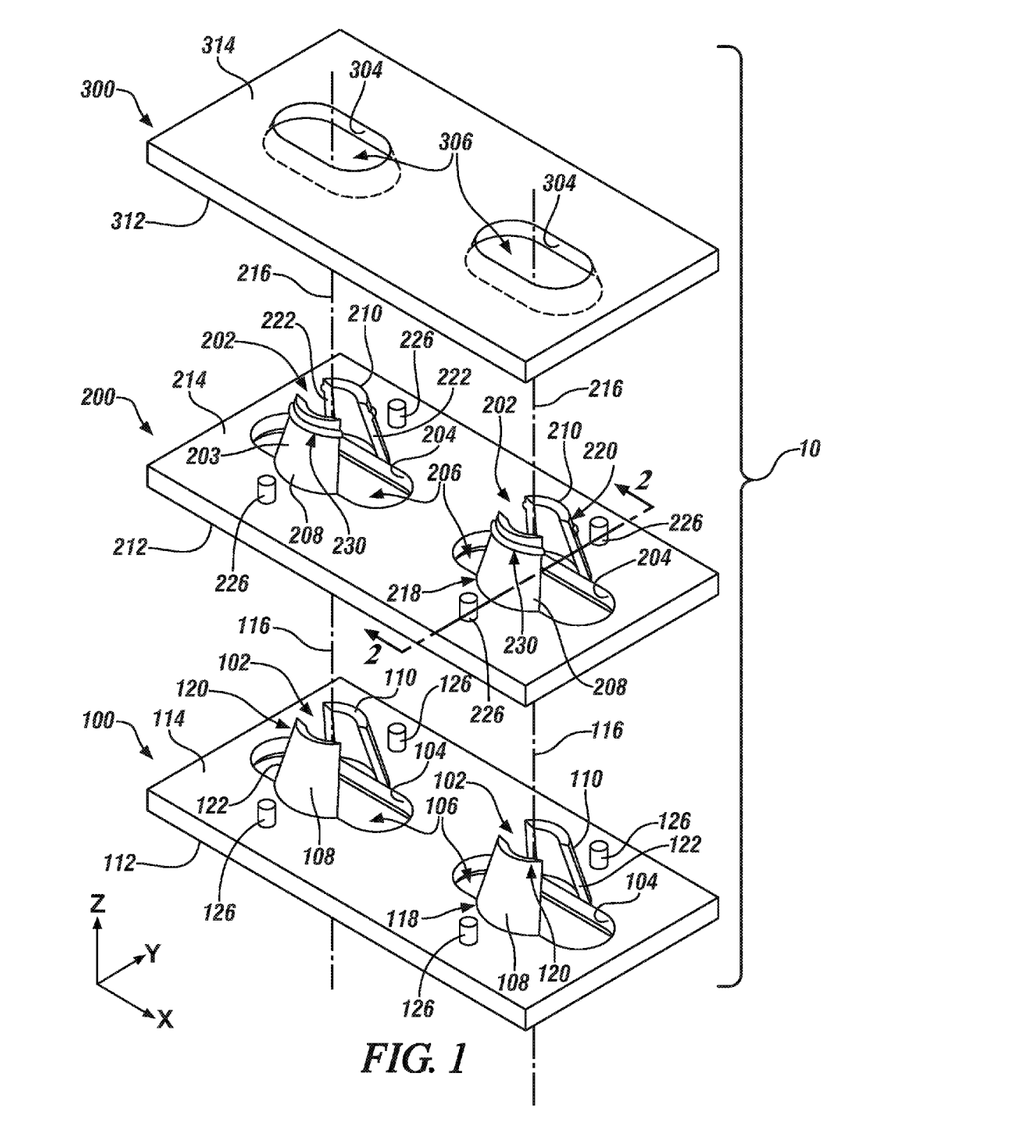
FIG. 1 is a perspective view of a disassembled, exemplary elastically averaged alignment system.
Figures 2, 3, 4:
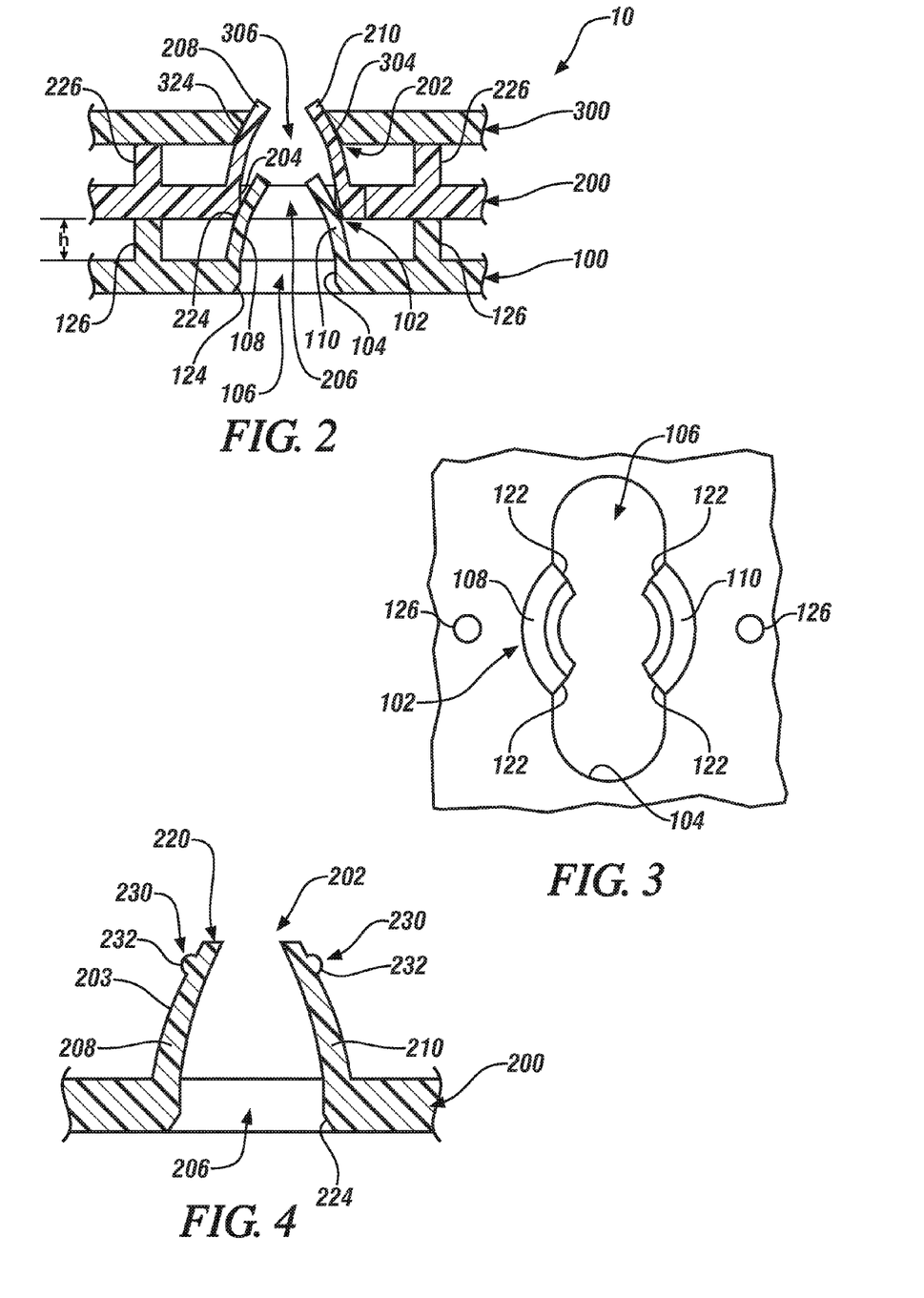
FIG. 2 is a cross-sectional view of the elastically averaged alignment system shown in FIG. 1 after assembly and taken along section line 2-2 of FIG. 1.
FIG. 3 is a plan view of an exemplary alignment member shown in FIGS. 1 and 2.
FIG. 4 is cross-sectional view of an exemplary alignment member and retention features that may be used with the system shown in FIGS. 1 and 2.

FIGS. 1 and 2 illustrate an exemplary elastically averaged alignment system 10 that generally includes a first component 100 to be mated to a second component 200, which is to be mated to a third component 300. First component 100 includes an elastically deformable alignment member 102 and an inner wall 104 defining an alignment aperture 106. Alignment member 102 includes a first segment or tab 108 and an opposed second segment or tab 110. In the exemplary embodiment, tabs 108, 110 are curved and may be substantially semi-circular. In other embodiments, tabs 108, 110 may have any suitable shape that enables system 10 to function as described herein. Alignment member 102 and alignment aperture 106 are fixedly disposed on or formed integrally with component 100 for desired alignment and orientation when components 100 and 200 are mated, as described herein in more detail. Although two alignment members 102 and associated alignment apertures 106 are illustrated in FIG. 1, component 100 may have any number and combination of corresponding alignment members 102 and alignment apertures 106.

Second component 200 includes an elastically deformable alignment member 202 and an inner wall 204 defining an alignment aperture 206. Alignment member 202 includes a first segment or tab 208 and an opposed second segment or tab 210. In the exemplary embodiment, tabs 208, 210 are curved and may be substantially semi-circular. In other embodiments, tabs 208, 210 may have any suitable shape that enables system 10 to function as described herein. Alignment member 202 and alignment aperture 206 are fixedly disposed on or formed integrally with component 200 for proper alignment and orientation when components 100 and 200 and/or 200 and 300 are mated, as described herein in more detail. Although two alignment members 202 and associated alignment apertures 206 are illustrated in FIG. 1, component 200 may have any number and combination of corresponding alignment members 202 and alignment apertures 206. In the exemplary embodiment, components 100 and 200 are substantially the same such that they may be produced from the same mold, machine, etc. As such, any desired number of the modular components may be stacked and coupled together to provide a desired size of system 10.

Elastically deformable alignment member 102 is configured and disposed to interferingly, deformably, and matingly engage wall 204 of alignment aperture 206, as discussed herein in more detail, to precisely align first component 100 with second component 200 in two or four directions, such as the +/−x-direction and the +/−y-direction of an orthogonal coordinate system, for example, which is herein referred to as two-way and four-way alignment. Moreover, elastically deformable alignment member 102 matingly engages alignment aperture 206 to facilitate a stiff and rigid connection between first component 100 and second component 200, thereby reducing or preventing relative movement therebetween.

Third component 300 includes an inner wall 304 defining an alignment aperture 306. Alignment aperture 306 is fixedly disposed on or formed integrally with component 300 for proper alignment and orientation when components 200 and 300 are mated, as described herein in more detail. Although two alignment apertures 306 are illustrated in FIG. 1, component 300 may have any number and combination of corresponding alignment apertures 306. In the exemplary embodiment, component 300 is configured to be an endpiece of stacked system 10 and, as such, does not include alignment members. Although not shown, component 100 may be configured as the opposite end-piece of system 10 and may not include alignment aperture 106.

Elastically deformable alignment member 202 is configured and disposed to interferingly, deformably, and matingly engage wall 304 of alignment aperture 306, as discussed herein in more detail, to precisely align second component 200 with third component 300 in two or four directions, such as the +/−x-direction and the +/−y-direction of an orthogonal coordinate system, for example. Moreover, elastically deformable alignment member 202 matingly engages wall 304 of alignment aperture 306 to facilitate a stiff and rigid connection between second component 200 and third component 300, thereby reducing or preventing relative movement therebetween.

In the exemplary embodiment, first component 100 generally includes an outer face 112 and an inner face 114 from which alignment member 102 extends. Alignment member 102 is a generally circular, hollow shape having a central axis 116, a proximal end 118 coupled to inner face 114, and a distal end 120. However, alignment member 102 may have any cross-sectional shape that enables system 10 to function as described herein. In the exemplary embodiment, alignment aperture 106 is an elongated slot (e.g., similar to the shape of elastic tube alignment system described in commonly owned co-pending U.S. patent application Ser. No. 13/187,675, U.S. Patent Publication 2013/0019455, and particularly illustrated in FIG. 13 of the same). In other embodiments, alignment aperture 106 may have any suitable shape that enables system 10 to function as described herein. For example, alignment aperture 106 may be circular. Alignment member 102 also includes edges 122 extending between proximal end 118 and distal end 120. In the exemplary embodiment, a wall thickness of tabs 108, 110 is varied between proximal end 118 and distal end 120 (e.g., FIG. 4). In other embodiments, the wall thickness of tabs 108, 110 may be constant. Further, as shown in FIGS. 2-4, tabs 108 and 110 are angled inward toward each other such that tabs 108, 110 extend over at least a portion of alignment aperture 106.

First component 100 may optionally include one or more stand-offs 126 (FIGS. 1 and 2) for engaging and supporting second component 200. In the exemplary embodiment, first component 100 is fabricated from a rigid material such as plastic. However, first component 100 may be fabricated from any suitable material that enables system 10 to function as described herein.

Similar to first component 100, second component 200 generally includes an outer face 212 and an inner face 214 from which alignment member 202 extends. Alignment member 202 is a generally circular, hollow shape having a central axis 216, a proximal end 218 coupled to inner face 214, and a distal end 220. However, alignment member 202 may have any cross-sectional shape that enables system 10 to function as described herein. In the exemplary embodiment, alignment aperture 206 is an elongated slot. In other embodiments, alignment aperture 206 may have any suitable shape that enables system 10 to function as described herein. For example, alignment aperture 206 may be circular. Alignment member 202 also includes edges 222 extending between proximal end 218 and distal end 220. In the exemplary embodiment, a wall thickness of tabs 208, 210 is varied between proximal end 218 and distal end 220. Alternatively, the wall thickness of tabs 208, 210 may be constant. Second component 200 may optionally include one or more stand-offs 226 for engaging and supporting third component 300 or another component similar to components 100, 200. In the exemplary embodiment, second component 200 is fabricated from a rigid material such as plastic. However, second component 200 may be fabricated from any suitable material that enables system 10 to function as described herein.

Moreover, as shown in FIGS. 1 and 4, alignment member 202 may include one or more retention features 230 to facilitate retention of alignment member 202 within alignment aperture 306. Although not shown, alignment member 102 may also include one or more retention features described herein. In the exemplary embodiment, retention feature 230 is a lip or rib 232 extending from an outer wall 203 of tab 208 proximate distal end 220. Rib 232 extends at least partially between edges 222 and is configured to engage inner face 314 and/or inner wall 304. For example, retention rib 232 interferingly engages inner face 314 to increase the amount of force required to disengage or otherwise back-out alignment member 202 from within alignment aperture 306. In other embodiments, retention feature 230 is an indentation or notch (not shown) formed in outer wall 203 of tab 210 proximate alignment member distal end 220. The notch at least partially extends between edges 222 and is configured to receive and engage at least a portion of third component 300. For example, alignment member 202 is inserted into alignment aperture 306 until inner wall 304 is seated within the notch to increase the amount of force required to disengage or otherwise remove alignment member 202 from within alignment aperture 306. Accordingly, retention features 230 facilitate improved retention of alignment member 202 within alignment aperture 306. Further, tabs 208, 210 may have any combination, number, and location of retention features 230 that enables system 10 to function as described herein.

Inner wall 104, 204 and/or 304 may be elastically deformable to facilitate added elastic average tuning of system 10. For example, inner wall 204 and/or a surrounding portion of second component 200 may be made from an elastically deformable material and/or have a smaller thickness or gauge than the rest of component 200. As such, during insertion of alignment member 102 into alignment aperture 206, inner wall 204 and/or a surrounding portion of component 200 elastically deforms to an elastically averaged final configuration to facilitate aligning first component 100 and second component 200 in a desired orientation. Accordingly, component tab thickness and component material and/or gauge may be adjusted to provide the desired elastic average mating between first component 100 and second component 200.

Figure 5:
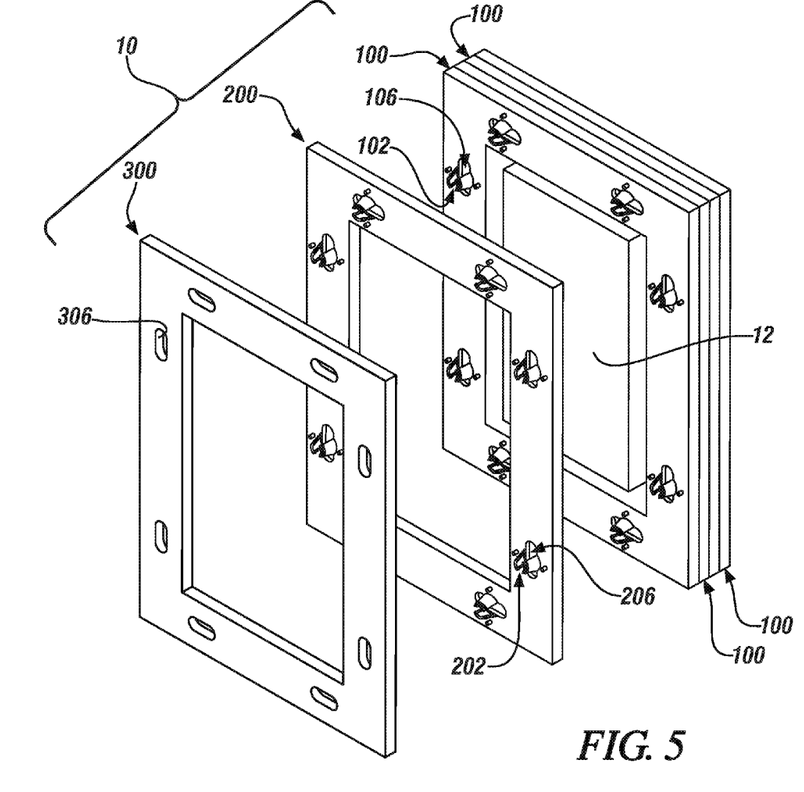
FIG. 5 is a perspective view of another exemplary elastically averaged alignment system for use in a vehicle.

While not being limited to any particular structure, as shown in FIG. 5, in one embodiment system 10 may be a battery containment and cooling housing structure of a vehicle. System 10 may be attached to the vehicle (not shown) and is configured to receive and contain one or more battery 12. For example, as illustrated, a plurality of first components 100 are stacked and coupled together around battery 12, and second component 200 is fixedly mounted in precise alignment with one component 100. Component 300 is positioned over the end of battery 12 and is fixedly mounted in precise alignment with component 200. Component 300 may be locked to component 200 with one or more mechanical fasteners (not shown) and/or retaining features 230 (FIG. 4), as described herein in more detail.

To provide an arrangement where elastically deformable alignment members 102, 202 are configured and disposed to interferingly, deformably and matingly engage respective inner walls 204, 304 of alignment apertures 206, 306, the diameter or cross-section of at least a portion of alignment apertures 206, 306 is less than or smaller than the diameter or cross-section of respective alignment members 102, 202, which creates a purposeful interference fit between the elastically deformable alignment members 102, 202 and alignment apertures 206, 306. Further, component 100, 200, 300 may include a chamfer 124, 224, 324 (FIG. 2) to facilitate insertion of alignment members 102, 202 or other alignment member. As such, when inserted into slotted alignment aperture 206, 306, portions of the elastically deformable alignment member 102, 202 elastically deform to an elastically averaged final configuration that aligns alignment member 102, 202 with respective alignment aperture 206, 306 in two planar orthogonal directions (the +/−x-direction or the +/−y-direction). Where alignment aperture 206 and/or 306 is generally circular, the associated alignment member, which may include more than two tabs (e.g., four tabs), is aligned in four planar orthogonal directions (the +/−x-direction and the +/−y-direction).

While FIG. 2 depicts a single elastically deformable alignment member 102 in a corresponding slotted aperture 206 to provide two-way alignment of the first component 100 relative to the second component 200, it will be appreciated that the scope of the invention is not so limited and encompasses other quantities and types of elastically deformable alignment elements used in conjunction with the elastically deformable alignment member 102 and corresponding aperture 206, as well as with the elastically deformable alignment member 202 and corresponding aperture 306.

With further reference to FIGS. 1 and 2, standoffs 126, 226 may be spaced relative to the outer perimeter of alignment aperture 106, 206 such that they provide a support platform at a height "h" above component inner face 114, 214. Component outer face 212, 312 is in contact with standoffs 126, 226 when elastically deformable alignment member 102, 202 is inserted into alignment aperture 206, 306. Standoffs 126, 226 are disposed and configured to provide a final positional orientation between alignment aperture 206, 306 and elastically deformable alignment member 102, 202 at an elevation "h" above the base, inner face 114, 214. While FIG. 1 depicts four standoffs 126 and four standoffs 226 in the form of posts at a height "h" relative to component inner face 114, 214, it will be appreciated that the scope of the invention is not so limited and also encompasses other numbers and shapes of standoffs 126, 226 suitable for a purpose disclosed herein, and also encompasses a standoff in the form of a continuous ring (not shown) disposed around alignment member 102, 202. Embodiments having such standoff arrangements are contemplated and considered within the scope of the invention disclosed herein. Moreover, while FIGS. 1 and 2 depict standoffs 126, 226 integrally formed on inner face 114, 214, it will be appreciated that a similar function may be achieved by integrally forming standoffs 126, 226 on outer face 212, 312, which is herein contemplated and considered to be within the scope of the invention disclosed herein. Alternatively, system 10 may not include standoffs.

In view of the foregoing, and with reference to FIG. 5, it will be appreciated that an exemplary embodiment of the invention includes elastically averaging alignment system 10 implemented in a vehicle (not shown). For example, first and second components 100, 200 may be configured to receive battery 12, which may be used to power to a vehicle powertrain and/or other vehicle system. However, it is contemplated that an elastically averaging alignment system 10 as herein disclosed may be utilized with other features of the vehicle, such as exterior body trim, front and rear fasciae, grill assemblies, stacked housings, interior trim, inserts, bezels, or decorative trim for example.

Figure 6:
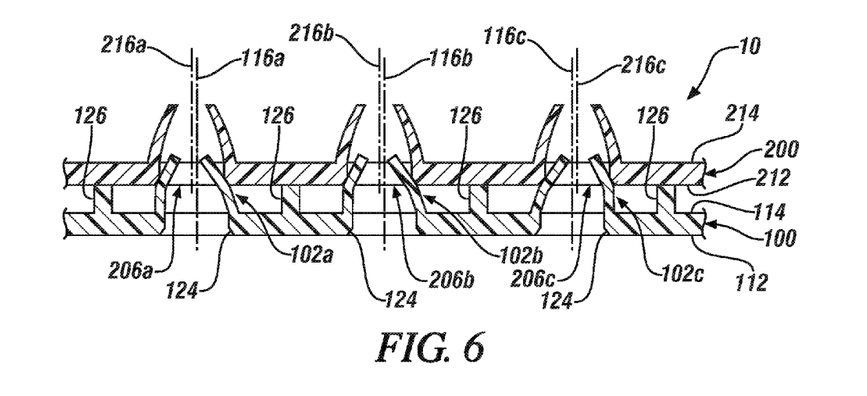
FIG. 6 is a cross-sectional view of yet another exemplary elastically averaged alignment system.

FIG. 6 illustrates cross-section of an exemplary elastically averaged alignment system 10 after coupling between components 100, 200. As shown, a plurality of alignment members 102a, 102b, and 102c are inserted into a plurality of corresponding alignment apertures 206a, 206b, 206c. Elastically deformable alignment members 102a, 102b, and 102c facilitate elastic averaging over the total of alignment members 102 to facilitate substantially aligning centerlines 116a, 116b, and 116c with centerlines 216a, 216b, and 216c of corresponding alignment aperture 206a, 206b, 206c, and leading to an improved coupling between first component 100 and second component 200. Due, for example, to the manufacturing tolerance and variance of oversized alignment apertures 206a-c, apertures 206a-c may be formed in a location other than the illustrated location. Alignment members 102a-c elastically deform within respective alignment apertures 206a-c to facilitate bringing centerlines 116a-c more in-line with centerlines 216a-c of respective alignment apertures 206a-c. As shown in the exemplary embodiment, alignment members 102a, 102b deform generally to the left while alignment member 102c deforms generally to the right. Accordingly, because of manufacturing tolerances/variations, alignment members 102a, 102b, and 102c elastically average out the misalignment or positional error of the alignment features of first and second components 100, 200 to couple them in a desired orientation. As such, centerlines 116a-c and/or centerlines 216a-c are held to a desired edge, feature, etc. that requires precision alignment. In the exemplary embodiment, the deflection of each alignment member 102a and 102b is approximately half the deflection of alignment member 102c (i.e., the deflection of member 102c to the right is averaged between the opposed deflections of members 102a, 102b to the left).

An exemplary method of fabricating elastically averaged alignment system 10 includes forming first component 100 with at least one alignment member 102, chamfer 124, and inner wall 104 defining alignment aperture 106. Second component 200 is formed with at least one alignment member 202, chamfer 224, and inner wall 204 defining alignment aperture 206. Third component 300 is formed with at least one chamfer 324 and inner wall 304 defining alignment aperture 306. At least one of alignment member 102, 202 and alignment aperture 106, 206, 306 is formed to be elastically deformable such that when alignment member 102, 202 is inserted into an alignment aperture (e.g., 106, 206, 306), at least one of alignment member 102, 202 and inner wall 104, 204, 304 elastically deform to an elastically averaged final configuration to facilitate aligning first component 100, second component 200, and/or third component 300 in a desired orientation.

Alignment member 102, 202 is formed with first tab 108, 208 and second tab 110, 210 extending from an edge of alignment aperture 106, 206. Further, tab wall thickness may vary between proximal and distal ends 118, 120 and 218, 220, and tabs 108, 110 and 208, 210 may be formed to extend inwardly toward each other such that they are positioned over alignment aperture 106, 206. Moreover, alignment member 102, 202 may be formed with retention member 230 to facilitate engagement and interference between alignment member 102 and second component 200 and between alignment member 202 and third component 300. For example, alignment member 102, 202 may be formed with rib 232 and/or a notch on outer wall 103, 203.

Elastically averaged mating assembly systems are described herein. The systems generally include a first component with an elastically deformable alignment member positioned about an alignment aperture for insertion into an alignment aperture of a second component. The second component also includes an alignment member positioned about its alignment aperture for insertion into an alignment aperture of a third component. The mating of the first, second, and third components is elastically averaged over a corresponding pair or pairs of elastically deformable alignment members and alignment apertures to precisely mate the components in a desired orientation. The systems may include a retention member for self-retention of the alignment member within the alignment aperture. Further, the components may be substantially identical to provide a modular system having components that couple to each other.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An elastically averaged alignment system comprising:
   a first component and a second component, each of the first and second components having substantially a same construction and comprising:
   a body;
   an inner wall formed in the body and defining an alignment aperture; and
   an alignment member comprising a pair of tabs extending from the body, wherein the alignment member is an elastically deformable material such that when the first component alignment member is inserted into the second component alignment aperture, the first component alignment member elastically deforms to an elastically averaged configuration to facilitate aligning and stacking the first component relative to the second component;
   wherein the system further comprises:
   a third component absent the pair of tabs of the alignment member, the third component comprising a body and an inner wall defining an alignment aperture, wherein when the second component alignment member is inserted into the third component alignment aperture, the second component alignment member elastically deforms to an elastically averaged final configuration to facilitate aligning and stacking the second and third components in a defined orientation.

2. The system of claim 1, wherein the second component alignment member comprises an outer wall having a retention feature configured to engage the third component inner wall and facilitate preventing the second component alignment member from being removed from the third component alignment aperture after insertion therein, wherein the retention feature comprises at least one of a rib extending from the outer wall and a notch formed in the outer wall.

3. The system of claim 1, further comprising a battery carried by at least one of the first and second components.

4. The system of claim 1, wherein the first component comprises more than one of the elastically deformable alignment member and the second component comprises more than one of the alignment aperture, the more than one elastically deformable alignment member being geometrically distributed with respect to respective ones of the more than one alignment apertures, such that portions of the elastically deformable alignment member of respective ones of the more than one elastically deformable alignment members, elastically deform to an elastically averaged final configuration that further aligns the first component and the second component in at least two of four planar orthogonal directions.

5. A method of manufacturing an elastically averaged alignment system, the method comprising:
   forming a first and a second component each having substantially a same construction and comprising a body, an inner wall formed in the body and defining an alignment aperture, and an alignment member having a pair of tabs extending from the body;
   forming the alignment members from an elastically deformable material such that when the first component alignment member is inserted into the second component alignment aperture, the first component alignment aperture elastically deforms to an elastically averaged configuration to facilitate aligning and stacking the first component relative to the second component; and forming a third component absent the pair of tabs of the alignment member, the third component comprising an inner wall defining an alignment aperture, wherein when the second component alignment member is inserted into the third component alignment aperture, the second component alignment aperture elastically deforms to an elastically averaged configuration to facilitate aligning and stacking the second component and the third component.

6. The method of claim 5, further comprising coupling a battery to at least one of the first component and the second component.

7. The method of claim 5, further comprising forming the pair of tabs on opposed edges of the alignment aperture such that the pair of tabs are angled inward toward each other and extend at least partially over the alignment aperture.

* * * * *